United States Patent
Fujihara et al.

(10) Patent No.: US 7,050,604 B2
(45) Date of Patent: May 23, 2006

(54) IMAGE DATA PROTECTION TECHNIQUE

(75) Inventors: Shiro Fujihara, Tokyo (JP); Toshihiro Masumoto, Tokyo (JP)

(73) Assignee: NEC Corporation, Tokyo (JP)

( * ) Notice: Subject to any disclaimer, the term of this patent is extended or adjusted under 35 U.S.C. 154(b) by 657 days.

(21) Appl. No.: 10/036,040

(22) Filed: Oct. 26, 2001

(65) Prior Publication Data

US 2002/0061122 A1  May 23, 2002

(30) Foreign Application Priority Data

Oct. 26, 2000  (JP) .............................. 2000-327392

(51) Int. Cl.
  G06K 9/00 (2006.01)
  H04N 7/167 (2006.01)
  H11B 15/04 (2006.01)
  H11B 19/04 (2006.01)

(52) U.S. Cl. ......................... 382/100; 360/60; 380/201

(58) Field of Classification Search ................ 382/100; 711/163, 156; 710/34; 360/60; 380/201–204
See application file for complete search history.

(56) References Cited

U.S. PATENT DOCUMENTS

| 6,314,518 | B1 * | 11/2001 | Linnartz ..................... 713/176 |
| 6,526,510 | B1 * | 2/2003 | Kori et al. ................... 713/176 |
| 6,571,220 | B1 * | 5/2003 | Ogino et al. .................. 705/51 |
| 6,687,802 | B1 * | 2/2004 | Kori et al. ................... 711/163 |
| 6,701,062 | B1 * | 3/2004 | Talstra et al. ................. 386/94 |

FOREIGN PATENT DOCUMENTS

| JP | 10-155151 | 6/1998 |
| JP | 11-177924 | 7/1999 |
| JP | 11-353796 | 12/1999 |
| JP | 2000-30367 | 1/2000 |
| JP | 2000-123480 | 4/2000 |

* cited by examiner

Primary Examiner—Joseph Mancuso
Assistant Examiner—Shefali Patel
(74) Attorney, Agent, or Firm—Scully, Scott, Murphy & Presser, P.C.

(57) ABSTRACT

An image data processing device allowing both of user side and provider side to obtain benefits, leading to market expansion, is disclosed. When an image content is copied, an additional watermark is inserted into the copied image content. When an additional watermark is detected from input image content data, a further copy of the image content is prohibited.

4 Claims, 6 Drawing Sheets

IMAGE DATA PROTECTION TECHNIQUE

BACKGROUND OF THE INVENTION

1. Field of the Invention

The present invention relates to image data processing techniques and in particular to an image data processing device and method allowing copyright protection.

2. Description of the Prior Art

With wide-spreading digital satellite broadcasting, the Internet, and DVD (Digital Video Disk), etc. in recent years, digital images are becoming easily accessible to users. Since the quality of digital images does not deteriorate when they are copied, copyright protection has been an important issue.

For protection of video contents, motion-picture or still-picture contents, and the like, a scrambling method of scrambling image contents is not so effective. Once its descrambling algorithm has been known by a third person, unauthorized copying cannot be prevented.

As another copyright protection method, there has been proposed a digital watermarking system. More specifically, at a contents provider, watermark data is embedded into DCT (discrete cosine transform) coefficient domain of compressed image data. At a user terminal, it is checked whether a watermark is embedded in the input image data. When the watermark has been detected from the input image data, the watermark detection result is displayed and thereby copying can be effectively prevented (see Japanese Patent Application Unexamined Publication No. 10-155151).

Accordingly, by embedding a watermark indicating that copies of this image data are prohibited, the contents provider can effectively prohibit the user to copy it while playing back. Contrarily, it is possible to embed a watermark indicating that copies of this image data are permitted.

On the other hand, in the music industry, a copy protection system called CGMS (Copy Generation Management System) has been employed to limit to only one copy from a music CD (compact disk) to a MD (minidisk). Copy-once data has been written in the music CD. When the content of the music CD is copied to a MD, the copy-once data is detected and copy-never data is written in the MD. Accordingly, only one copy from the CD to MD is permitted. Such a copy protection system effectively prevents wide-spreading illegal copies.

In a conventional watermarking system, however, a watermark embedded in an image content indicates one of "copy-prohibition" and "copy-free" Accordingly, many contents providers desire to set watermarks embedded in their own contents to "copy-prohibition" so as to avoid copying without limitation. In the case where almost all image contents commercially available are copy-prohibited, however, few consumers will purchase an image recording device having the image copying function, resulting in market reduction.

SUMMARY OF THE INVENTION

It Is an object of the present invention to provide an image data processing device and method allowing both of user side and provider side to obtain benefits, leading to market expansion.

According to the present invention, an image data processing device for processing an input image content data to produce an output image content data, includes: a detector for detecting a permission limiting watermark from the input image content data: and a controller for controlling transferring and blocking of the input image content data such that the output image content data is produced from the input image content data a limited number of times when the permission limiting watermark is detected.

The limited number of times may be determined by the permission limiting watermark. The input image content data may be inputted when a copy is performed. The permission limiting watermark may be a copy-once watermark indicating that a copy is permitted only once.

The image data processing device may further include an additional watermark inserter for inserting an addition watermark in the input image content data to produce the output image content data when the copy is performed.

The controller may include an additional watermark detector for detecting the additional watermark from the input image content data, wherein, when the additional watermark is detected from the input image content data, the controller blocks the transfer of the input image content data so as not to produce the output image content data.

The additional watermark inserter may block the transfer of the input image content data under control of the controller when the additional watermark is detected.

According to another aspect of the present invention, an image data processing device for processing an input image content data to produce an output image content data, includes: a first detector for detecting a permission limiting watermark from the input image content data; a second detector for detecting an additional watermark from the input image content data, wherein the additional watermark is inserted when an original image content Is copied; and a controller for producing the output image content data from the input image content data when the permission limiting watermark and the additional watermark are both detected and prohibiting production of the output image content data when the permission limiting watermark is detected and the additional watermark is not detected.

The input image content data may be inputted when playback is performed.

The image data processing device may further includes a third detector for detecting a type of a medium storing the input image content data, wherein, when the medium is writable, the controller produces the output image content data from the input image content data when the permission limiting watermark and the additional watermark are both detected and prohibits production of the output image content data when the permission limiting watermark is detected and the additional watermark is not detected, and when the medium is not writable, the controller unconditionally produces the output image content data from the input image content data.

According to the present invention, a copy permission method includes the steps of: detecting a permission limiting watermark from the input image content data, wherein the permission limiting watermark provides a predetermined number of copying times; and permitting a copy of image content data the predetermined number of copying times when the permission limiting watermark is detected.

The copy permission method may further include the step of: inserting an addition watermark in input image content data to produce output image content data when the copy is performed.

The copy permission method may further include the steps of: detecting the additional watermark from the input image content data; and when the additional watermark is detected from the input image content data, blocking the transfer of the input image content data so as not to produce the output image content data.

According to the present invention, a playback permission method includes the steps of: detecting a permission limiting watermark from the input image content data: detecting an additional watermark from the input image content data, wherein the additional watermark is inserted when an image content is copied; when the permission limiting watermark and the additional watermark are both detected, permitting playback of the image content: and when the permission limiting, watermark is detected and the additional watermark Is not detected, prohibiting playback of the image content.

The playback permission method may further include the steps of detecting a type of a medium storing the image content: when the medium is writable, permitting playback of the image content when the permission limiting watermark and the additional watermark are both detected: and prohibiting playback of the image content when the permission limiting watermark is detected and the additional watermark is not detected; and when the medium is not writable, unconditionally permitting playback of the image content.

DETAILED DESCRIPTION OF THE PREFERRED EMBODIMENTS

Hereafter, the preferred embodiments of the present invention will be described in detail,

FIRST EMBODIMENT

An image data processing device according to a first embodiment of the present invention is applied to a system having an image content copying function. The image data processing device according to the first embodiment is capable of controlling copy permission and prohibition of image content of compressed moving-picture data conforming to MPEG standard. The image data processing device has a circuit structure as shown in FIG. 1.

Figure 1:
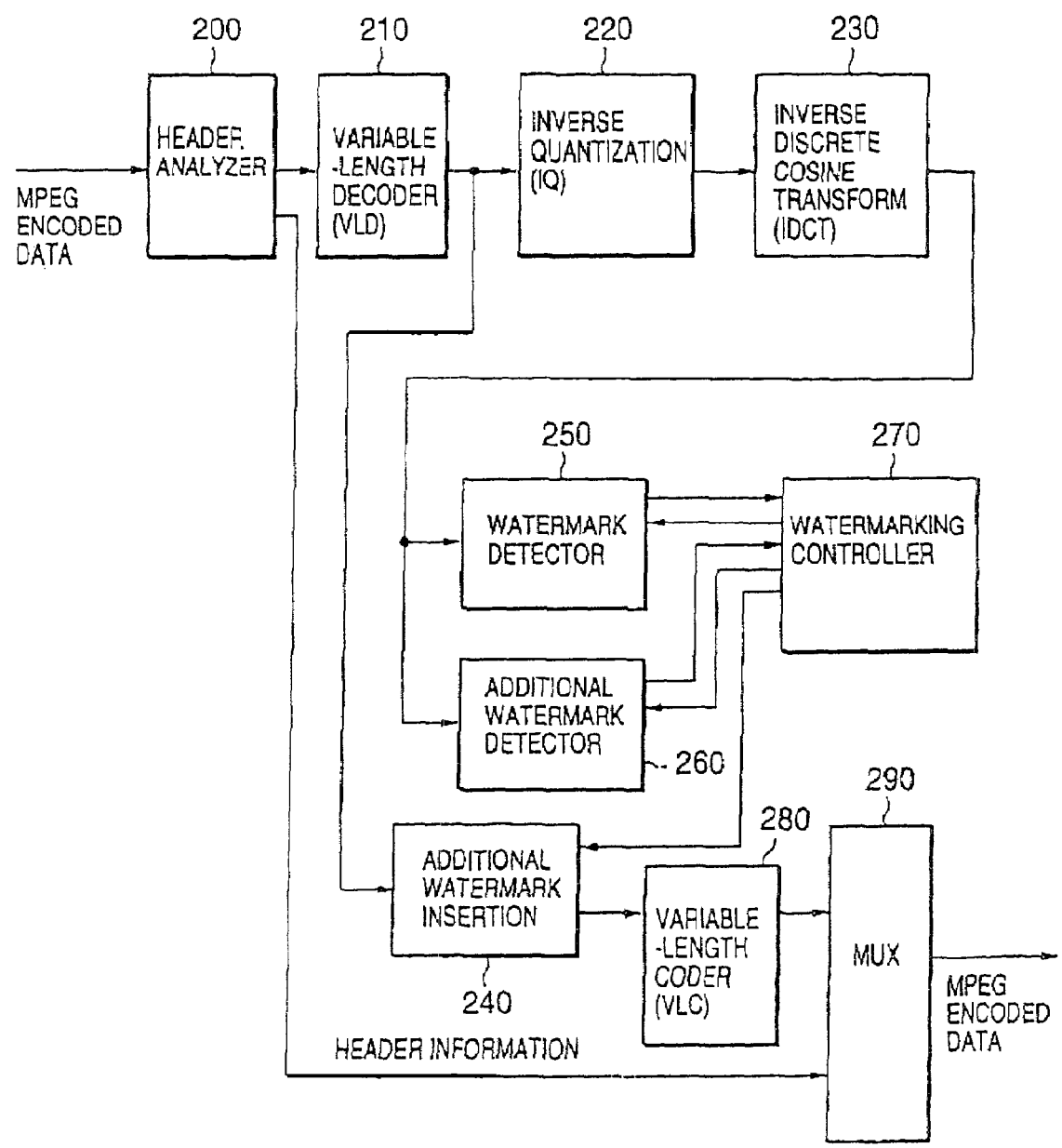
FIG. 1 is a block diagram showing an image data processing device according to a first embodiment of the present invention.

Referring to FIG. 1, a header analyzer 200 analyzes the MPEG-encoded data to split It into header information and image information representing an image itself, the header information including the resolution and aspect ratio of the image and other necessary information. The image information is output to a variable-length decoder (VLD) 210. The header information is output to a multiplexer 290.

The variable-length decoder 210 decodes the image information to produce a fixed length code that is a combination of run length and level for each 8×8 a block of a picture. The decoded image information is output from the variable-length decoder 210 to an inverse quantization (IQ) section 220 and a additional watermark insertion section 240.

The inverse quantization section 220 performs inverse quantization of the output of the variable-length decoder 210 to produce a sequence of 64 DCT coefficients for each block. The 64 DCT coefficients for each block are subjected to two-dimensional inverse DCT to be converted from space frequency domain to real space domain at an inverse-DCT section 230. The inverse-DCT section 230 outputs real-space image information to a watermark detector 250 and a additional watermark detector 260.

The additional watermark insertion section 240 additionally inserts a predetermined watermark into the decoded image information received from the variable-length decoder 210 when the image content is copied by the user. Here, the additional watermark indicates that the image content was copied once. Under control of a watermark controller 270, the additional watermark insertion-section 240 can transfer the decoded image information as it is to a variable-length coder (VLC) 280 and block the transfer of the decoded image information to the variable-length coder (VLC) 280. In other words, the additional watermark insertion section 240 is also a kind of gate, which will be described later.

The watermark detector 250 analyzes the real-space image information to detect a watermark from the image content. More specifically, the watermark indicates one of three copy attributes: copy prohibition (hereinafter, called "Never copy"); only once copy permission (hereinafter, called "Copy once"); and freely copy permission (hereinafter, called "Copy free").

The additional watermark detector 260 analyzes the decoded image information received from the variable-length decoder 210 to detect the additional watermark.

The watermark controller 270 controls the additional watermark insertion section 240, the watermark detector 250, and the additional watermark detector 260.

The variable-length coder (VLC) 280 encodes the output of the additional watermark insertion section 240 to output variable-length codes to the multiplexer 290.

The multiplexer 290 multiplexes the variable-length encoded image information with the header information to produce a stream of MPEG encoded data, which is written as a copy of the image content onto the writable medium.

Operation

Hereafter, an operation of the first embodiment will be described with reference to FIG. 2. Here, it is assumed that one of Never-copy watermark, Copy-once watermark and Copy-free watermark is embedded in the MPEG encoded data.

Figure 2:
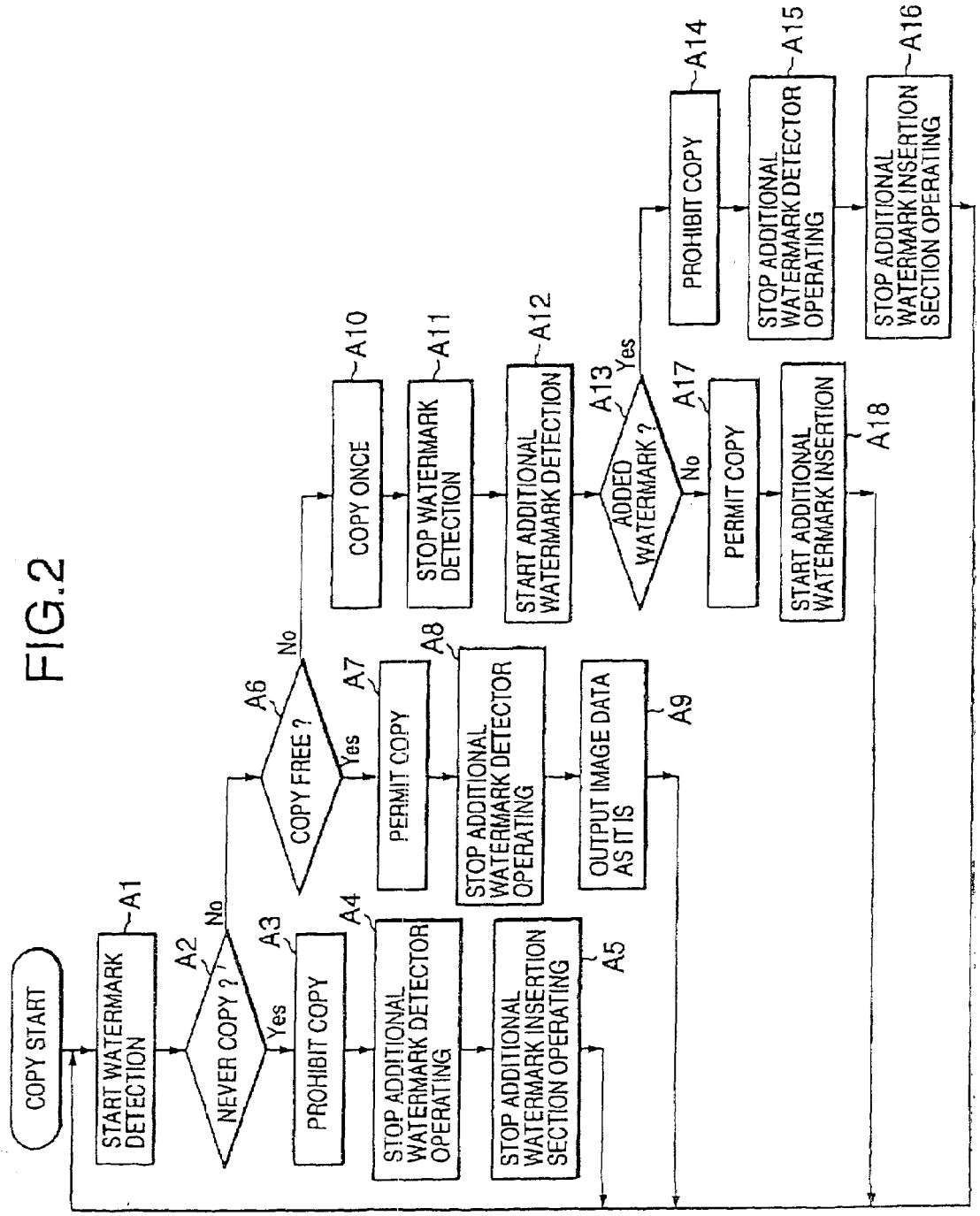
FIG. 2 is a flow chart showing a copy protection method according to the first embodiment of the present invention.

Referring to FIG. 2, when the user starts copying the image content to a writable medium, the watermark detector 250 inputs the image information from the inverse DCT section 230 and starts the watermark detection operation to determine which one of the Never-copy, Copy-once and Copy-free is indicated by the detected watermark (step A1).

1) Never Copy

When the detected watermark indicates "Never copy" (YES at step A2), the watermark detector 250 notifies the watermark controller 270 of detection of the Never-copy watermark. When the Never-copy watermark is detected, the watermark controller 270 determines that a copy of the image content is prohibited (step A3) and then instructs the additional watermark detector 260 to stop operating (step A4) and also instructs the additional watermark insertion section 240 to stop operating (step AS). Thereafter, only the watermark detector 250 operates.

Since the additional watermark insertion section 240 stops working, the decoded image information received from the variable-length decoder 210 is not transferred to the variable-length coder 280. In other words, MPEG encoded data is not generated. Accordingly, the image content cannot be copied by the user.

2) Copy Free

When the detected watermark indicates "Copy free" (YES at step A6), the watermark detector 250 notifies the watermark controller 270 of detection of the Copy-free watermark. When the Copy-free watermark is detected, the watermark controller 270 determines that a copy of the image content is permitted without limitation (step A7) and then instructs the additional watermark detector 260 to stop operating (step A8) and further instructs the additional watermark insertion section 240 to transfer the decoded image information as it is to the variable-length coder 280 (step A9). Accordingly, the multiplexer 290 multiplexes the variable-length encoded image information received from the variable-length coder 280 with the header information received from the header analyzer 200 to output the same MPEG encoded data as the input MPEG encoded data. Thereafter, only the watermark detector 250 performs watermark detection. Accordingly, the image content can be freely copied by the user.

3) Copy Once

When it is determined that the detected watermark is "Copy once" (NO at step A6 and step A10), the watermark detector 250 notifies the watermark controller 270 of detection of the Copy-once watermark. When notified, the watermark controller 270 instructs the watermark detector 250 to stop detection operating (step A11) and further instructs the additional watermark detector 260 to start additional watermark detection (step A12).

When the additional watermark is detected (YES at step A13), the additional watermark detector 260 notifies the watermark controller 270 of detection of the additional watermark. Thereby, the watermark controller 270 determines that the image content was added and therefore a further copy is prohibited (step A14) and then instructs the additional watermark detector 260 to stop operating (step A16) and also instructs the additional watermark insertion section 240 to stop operating (step A16). Thereafter, the watermark controller 270 instructs the watermark detector 250 to operate.

Since the additional watermark insertion section 240 stops working, the decoded image information received from the variable-length decoder 210 is not transferred to the variable-length coder 280. Accordingly, the image content cannot be copied by the user.

When the additional watermark is not detected (NC at step A13), the watermark controller 270 receives nothing from the additional watermark detector 260. In this case, the watermark controller 270 determines that a copy of the image content is permitted without limitation (step A17) and then instructs the additional watermark insertion section 240 to start insertion of the additional watermark. Thereafter, the watermark controller 270 instructs the watermark detector 250 to operate.

The additional watermark insertion section 240 inserts the additional watermark into the decoded image information received from the variable-length decoder 210 and outputs the additional watermark embedded image information to the variable-length coder 280. Accordingly, the multiplexer 290 multiplexes the variable-length encoded image information having the additional watermark embedded therein with the header information received to output the MPEG encoded data having the additional watermark embedded therein. Thereafter, the watermark detector 250 is instructed to perform watermark detection. Accordingly, the image content can be copied by the user.

After the additional watermark insertion section 240 has started insertion of the additional watermark, the watermark controller 270 instructs the additional watermark detector 260 to stop the additional watermark detection and further instructs the watermark detector 250 to start the watermark detection. The additional watermark insertion section 240 continues to perform the insertion of the additional watermark until a stop instruction has been received from the watermark controller 270.

As described above, according to the first embodiment. Copy-once is added as another copy attribute to the conventional watermark having two attributes: Never copy and Copy free. More specifically, when the Copy-once watermark Is detected or when the detected watermark is neither Never-copy nor Copy-free, it is further checked whether the additional watermark is detected. When the additional watermark has been detected, the copy of the image content is prohibited because the image content was copied once. Accordingly, the image content provider can authorize users to copy the image content without being concerned about an unlimited number of copies.

SECOND EMBODIMENT

An image data processing device according to a second embodiment of the present invention is applied to a system having no copying function but a playback function, for example, a DVD player. The image data processing device according to the second embodiment is capable of controlling playback permission and prohibition of the image content.

Figure 3:
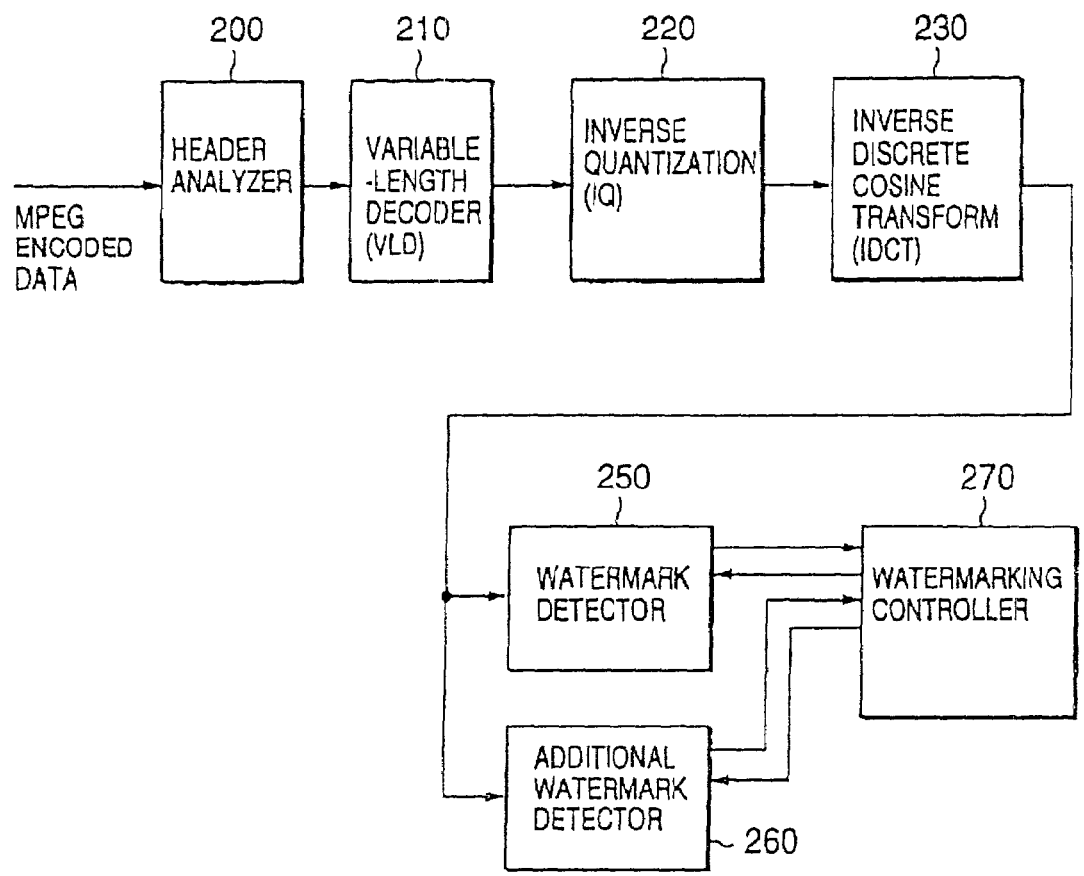
FIG. 3 is a block diagram showing an image data processing device according to a second embodiment of the present invention.

Referring to FIG. 3, the image data processing device according to the second embodiment is provided with the header analyzer 200, the variable-length decoder 210, the inverse quantization section 220, the inverse DCT section 230, the watermark detector 250, the additional watermark detector 260, and the watermark controller 270, which are similar to those previously described with reference to FIG. 1 and therefore the descriptions will be omitted. In addition, the image data processing device according to the second embodiment is provided with a medium detector which detects the type of an image recording medium loaded on the system. Here the image recording medium may be a writable medium such as a DVD-RAM or DVD-RW or a read-only medium.

Figure 4:
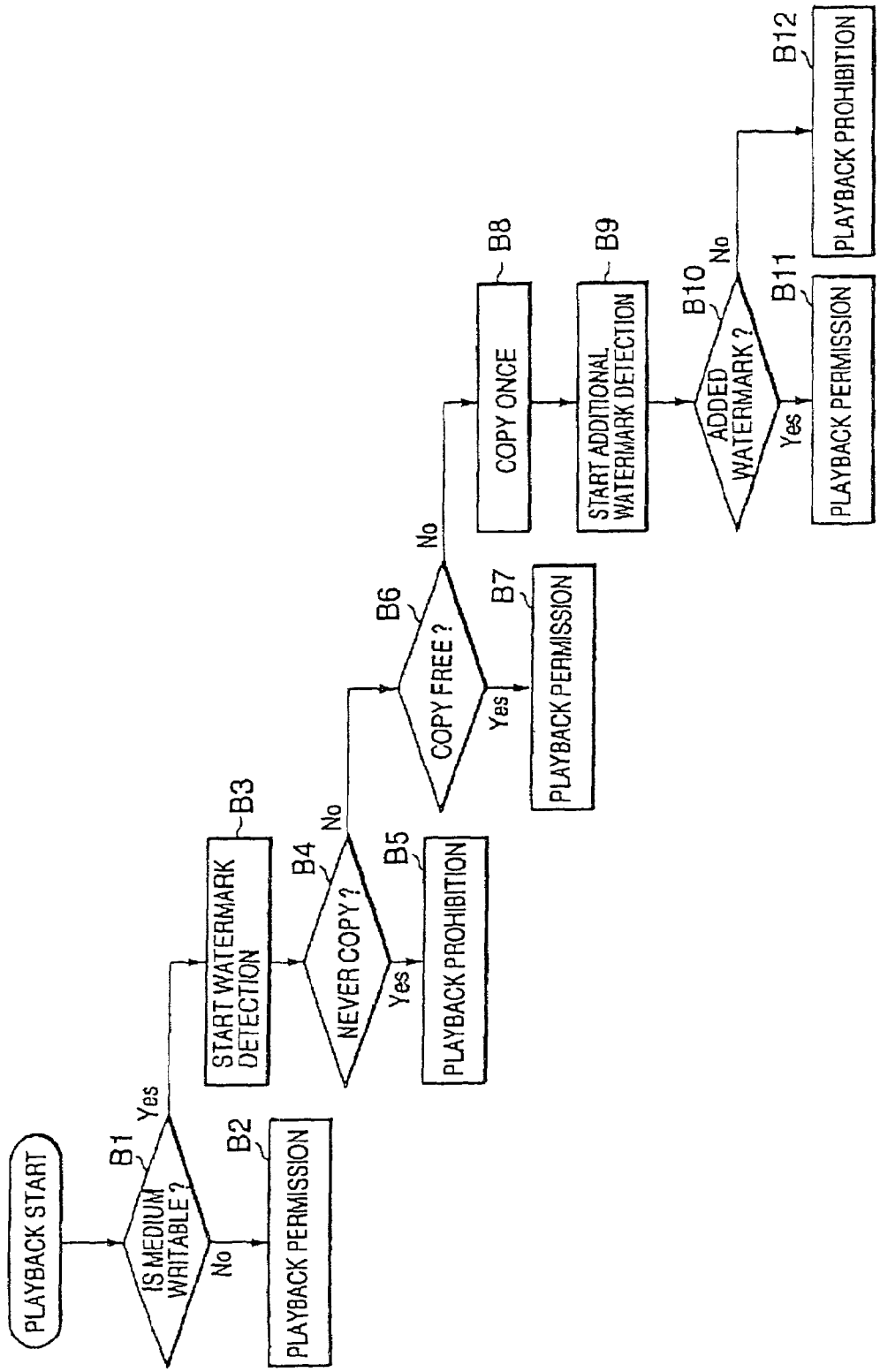
FIG. 4 is a flow chart showing a copy protection method according to the second embodiment of the present invention.

Referring to FIG. 4, when the user loads a disk on the system and starts playback, the medium detector detects the type of the disk loaded on the system (step B1). When it is not a writable medium (NO at step B1), it is determined that playback is permitted (step B2).

When the loaded disk is a writable medium (YES at step B1), the watermark detector 250 starts watermark detection (step B3). When the detected watermark indicates "Never-copy" (YES at step B4), it is determined that the playback is prohibited because the image content stored in the disk was illegally copied (step B5). When the detected watermark indicates "Copy-free" (NO at step B4 and YES at step B6), it is determined that the playback is permitted (step B7).

When the detected watermark indicates "Copy once" (NO at step B6 and step B8), the watermark detector 250 notifies the watermark controller 270 of detection of the Copy-once watermark. When the Copy-once watermark is detected, the watermark controller 270 instructs the additional watermark detector 260 to start detection operating (step B9). When the additional watermark is detected (YES at step B10), it is determined that the playback is permitted (step B11). When the additional watermark is not detected (NO at step B10), it is determined that the playback is prohibited because the image content stored in the disk was illegally copied (step B12).

As described above, according to the second embodiment, at the user side, it is determined whether the image content stored in the disk is illegally copied data. Accordingly, unauthorized copies can be prevented from circulation and the copyrights of the image content provider can be effectively protected.

THIRD EMBODIMENT

An image data processing device according to a third embodiment of the present invention has the same circuit structure as the first embodiment as shown in FIG. 1. In the first embodiment, the additional watermark detector 260 operates depending on the detection result of the watermark detector 250. In contrast, according to the third embodiment, the watermark controller 270 unconditionally controls such that the watermark detector 250 and the additional watermark detector 260 operate alternately. Accordingly, even if the watermark fails to be detected by the watermark detector 250 for some reason, once the additional watermark detector 260 successfully detects the additional watermark, a further copy is prohibited.

As described above, according to the third embodiment, even if the watermark fails to be detected by the watermark detector 250 for some reason, a possibility of copying the image content an unlimited number of times can be effectively reduced.

FOURTH EMBODIMENT

Figure 5:
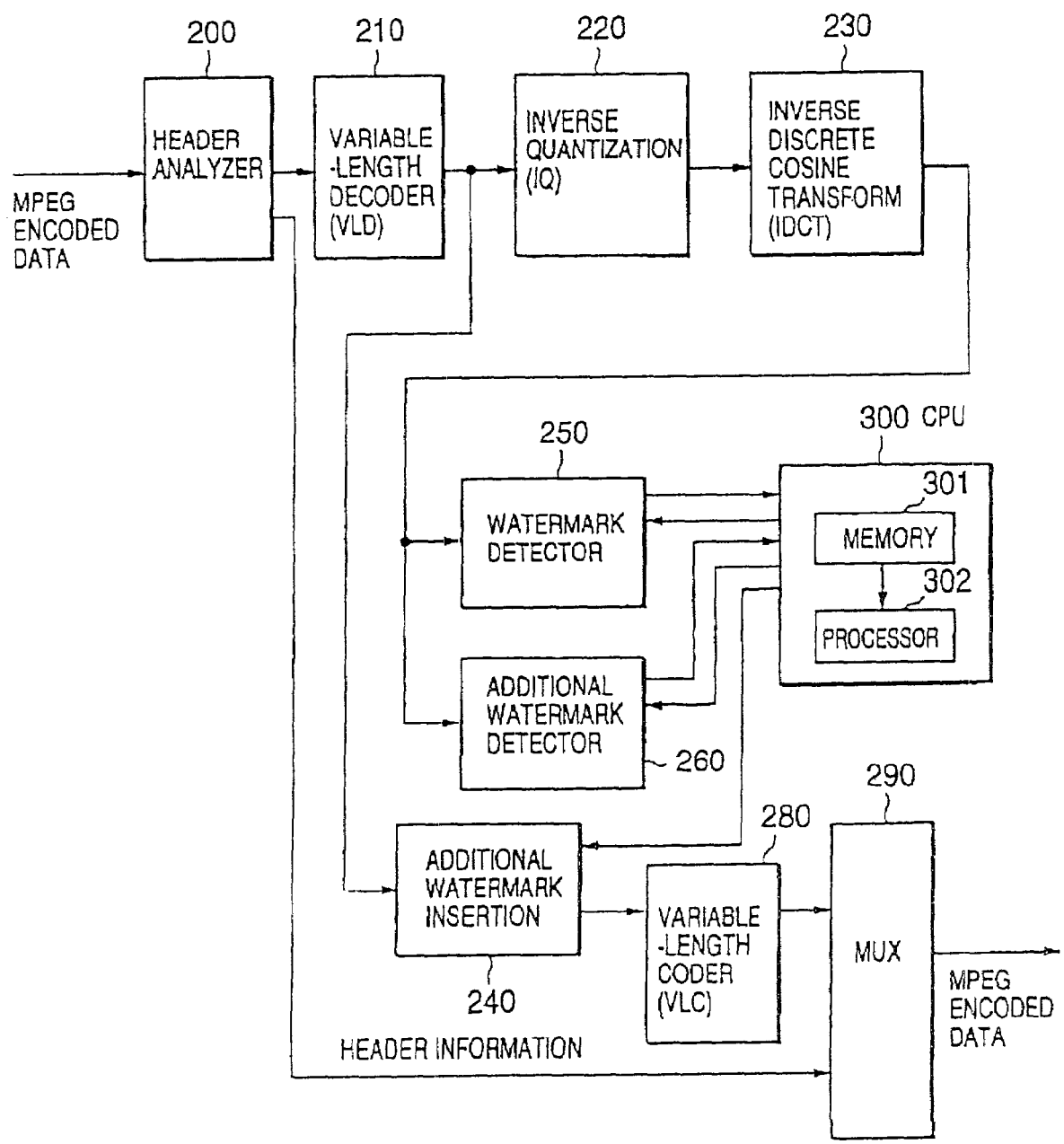
FIG. 5 is a block diagram showing an image data processing device according to a third embodiment of the present invention.

As shown in FIG. 5, an image data processing device according to a fourth embodiment of the present invention has the same circuit structure as the first embodiment as shown in FIG. 1 except for a central processing unit (CPU) section 300 including a memory 301 and a program-controlled processor 302.

The memory 301 stores a necessary watermarking control program corresponding to one of the above first to third embodiments. The watermarking control program runs on the program-controlled processor 302 to perform the watermark is control of the additional watermark insertion section 240, the watermark detector 250 and the additional watermark detector 260 according to one of the above first to third embodiments as described before. In other words, the watermark controller 207 in any of the above first to third embodiments can be implemented by changing only the watermark control program stored in the memory 301.

According to the fourth embodiment, it is very easy to change the watermark control flow, compared with the case where the watermark controller 270 is implemented with hardware.

FIFTH EMBODIMENT

An image data processing device according to a fifth embodiment of the present invention is applied to a system inputting an analog composite signal. The image data processing device according to the fifth embodiment is capable of controlling copy permission and prohibition of the image content.

Figure 6:
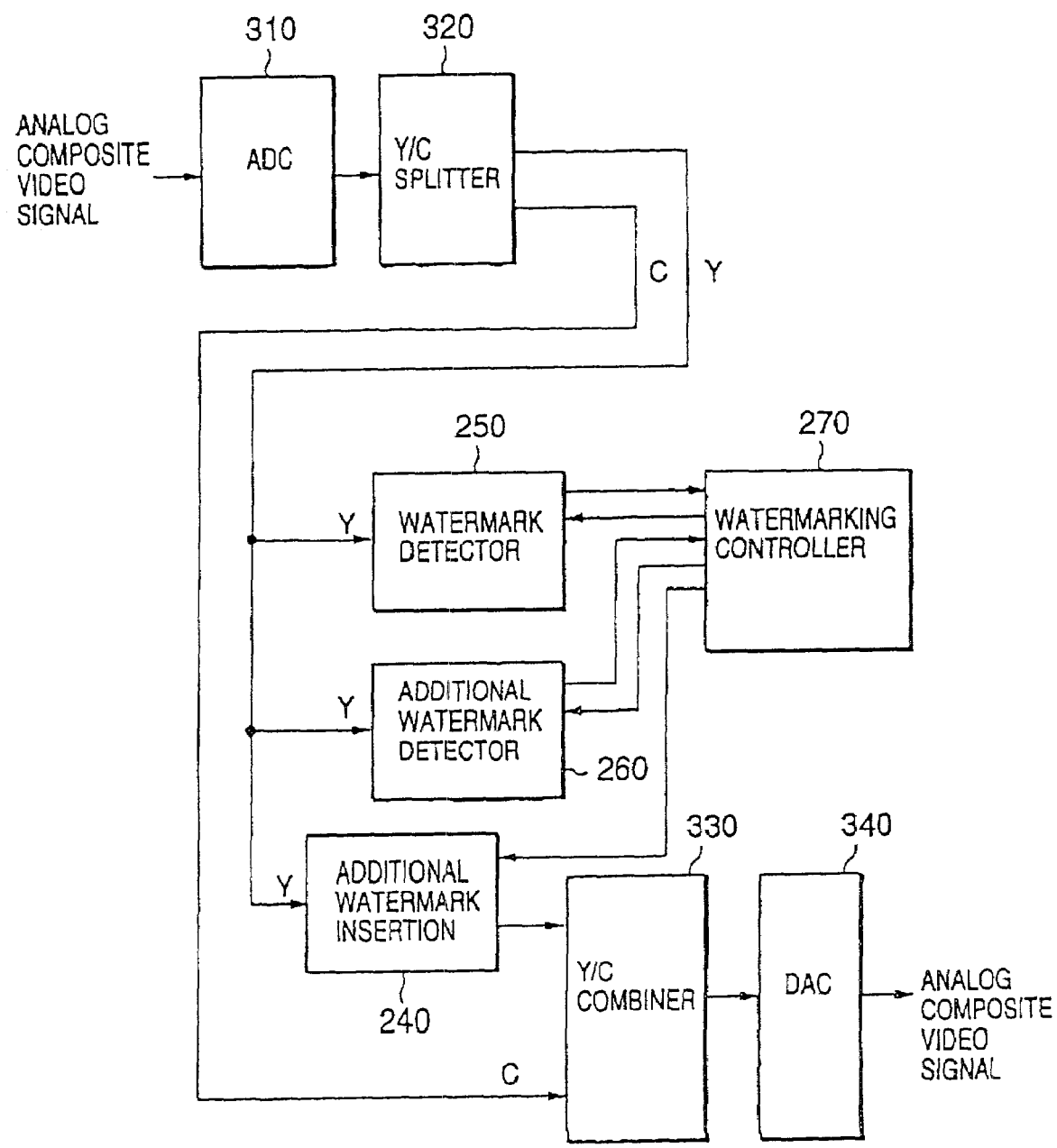
FIG. 6 is a block diagram showing an image data processing device according to a fourth embodiment of the present invention.

Referring to FIG. 6, the image data processing device is provided with an analog-to-digital converter (ADC) 310, a Y/C splitter 320, a Y/C combiner 330, and a digital-to-analog converter (DAC) 340.

The ADC 310 converts an input analog composite video signal to a digital composite video signal and the Y/C splitter 320 splits the digital composite video signal into a luminance (Y) signal and a chrominance (C) signal. The luminance (Y) signal is output to the additional watermark insertion section 240, the watermark detector 250 and the additional watermark detector 260. The chrominance (C) signal is output to the Y/C combiner 330.

The additional watermark insertion section 240, the watermark detector 250 and the additional watermark detector 260 operate under the control of the watermark controller 270 as described in the first to third embodiments. The watermark controller 270 may be implemented with software as described in the fourth embodiment. When the additional watermark insertion is performed, the additional watermark insertion section 240 outputs the luminance (Y) signal having the additional watermark embedded therein to the Y/C combiner 330. Accordingly, the Y/C combiner 330 combines the chrominance (C) signal received from the Y/C splitter 320 and the luminance (Y) signal received from the additional watermark insertion section 240 to produce a digital composite vide signal, which is converted to an analog composite video signal by the DAC 340.

In the first to fifth embodiments, when the image content is copied once, a further copy is prohibited Another embodiment of the, present invention may be designed to prohibit a further copy when the image content is copied a predetermined number of times. For example, each the image content is copied, the additional watermark insertion section 240 updates or inserts the additional watermark embedded in the image content and, when a predetermined additional watermark indicating the predetermined number of times has been detected, a further copy is prohibited.

The invention claimed is:

1. A data processing device for processing an input content data to produce an output content data, comprising:
   a first detector for detecting a permission limiting watermark from the input content data;
   a second detector for detecting an additional watermark from the input content data, wherein the additional watermark is inserted when an original content is copied; and
   a controller for producing the output content data from the input content data when the permission limiting watermark and the additional watermark are both detected and prohibiting production of the output content data when the permission limiting watermark is detected and the additional watermark is not detected; and
   a third detector for detecting a type of a medium storing the input content data, wherein,
   when the medium is writable, the controller produces the output content data from the input content data when the permission limiting watermark and the additional watermark are both detected and prohibits production of the output content data when the permission limiting watermark is detected and the additional watermark is not detected,
   when the medium is not writable, the controller unconditionally produces the output content data from the input content data.

2. The data processing device according to claim 1, wherein the input content data is compressed data conforming to MPEG standard.

3. The data processing device according to claim 1, wherein the input content data is digital data corresponding to an analog composite signal.

4. A playback permission method comprising the steps of:
   determining whether a permission limiting watermark is embedded in content data stored in a medium;
   determining whether an additional watermark is embedded in the content data, wherein the additional watermark is inserted when the content data is copied;
   detecting a type of a medium storing the content;
   when the medium is writable,
      permitting playback of the content when the permission limiting watermark and the additional watermark are both detected; and
      prohibiting playback of the content when the permission limiting watermark is detected and the additional watermark is not detected; and
   when the medium is not writable, unconditionally permitting playback of the content.

* * * * *